Figure 1:
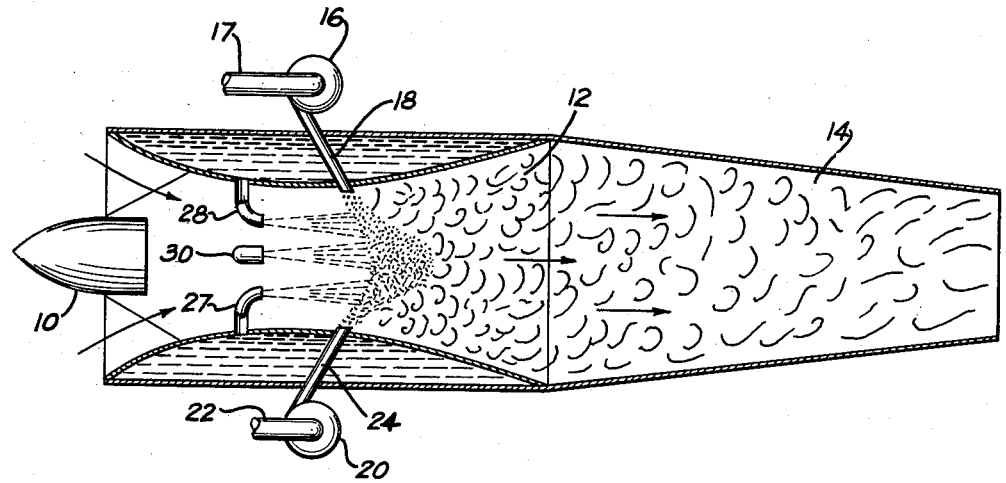

INVENTOR
*HARRY A. TOULMIN, JR.*

BY *Toulmin & Toulmin*

ATTORNEYS

United States Patent Office 3,122,429
Patented Feb. 25, 1964

3,122,429
JET OR ROCKET FUEL
Harry A. Toulmin, Jr., Dayton, Ohio, assignor to The Commonwealth Engineering Company of Ohio, Dayton, Ohio
Filed Sept. 4, 1959, Ser. No. 838,130
2 Claims. (Cl. 44—51)

This invention relates to improved fuels and methods of increasing the calorific value of fuels.

The invention is particularly useful in providing a fuel comprising for example a mixture of powdered carbonaceous material such as coal, charcoal or the like and powdered metals which are of relatively low molecular weight and burn easily and quickly to produce high temperatures and high velocity gases.

It is a principal object of the invention to provide a catalyzed powdered mixture which forms a suitable fuel for jet airplane engines, gas turbines, rockets, missiles, propellants, power plants, and as utilized in the fields of aviation, rail transportation, agricultural distribution systems for fertilizer and insecticides, destruction of vegetation, and as may be useful for military purposes, as for example flame throwers, fire bombs, etc.

It is another object of the invention to provide a composition useful as fuel, explosive products or as ignition catalysts for initiating and promoting high temperature reactions and the production of high velocity hot gases.

It is another object of the invention to provide a combustible composition which has very short flame propulsion area and which exhibits an accelerated rate of combustion due to the highly pyrophoric character of the fuel mixture.

It is another object of the invention to provide a powdered fuel mixture which may be used in the form of a slurry and containing auto-oxidation catalyst dispersed in a liquid hydrocarbon, and which produces a large amount of exothermic heat during combustion.

A still further object of the invention is to provide a method for accelerating the combustion of powdered combustible substances whereby the flame spreads through the mass of fuel and brings about the exploding and rapid disintegration of each of the powdered particles and the propagation of high velocity combustion gases. The powdered fuel mixture of the invention is characterized by exhibiting a high pressure area. By utilizing a suitable mixture of coal dust, finely divided metal particles, and auto oxidation catalysts, and dispersing the same while introducing a sufficient supply of air or oxygen, and preferably in the form of liquid ozone, maximum evolution of heat is obtained during combustion of the finely divided solid particles.

In accordance with the invention, a basic process is provided for obtaining high temperatures of combustion and the production of high exhaust velocity gases for propulsion purposes. The invention will be described more particularly with reference to the use of mixtures of powdered coals and finely divided metal particles, e.g., aluminum and magnesium. Other combustible powdered carbon and metals of similar nature, however, may be used or admixed therewith to provide an improved fuel.

In preparing the fuel mixture finely divided metal particles, especially metals of low atomic weight, for example aluminum, magnesium, beryllium, are mixed with powdered coal or carbonaceous material and a catalyst such as metal salt of fatty acid and commonly referred to as a metallic soap. The particle size of the coal or carbonaceous material is generally less than 1000 microns and preferably substantially in the same particle size range as the metal particles. The mixture of coal dust, metal particles and metallic soap may be used as a dry powder fuel or admixed with liquid hydrocarbon to form a slurry.

The proportionate amount of coal or charcoal dust and metal particles employed may, of course, be varied depending upon the metal used as well as the kind of coal dust employed and the particular use of which the fuel is to be put. For most purposes, the amount of powdered or finely divided metal particles present may range between about 1% and 35% by weight of the powdered mixture of coal dust and metal particles. Since the cost of powdered metal is relatively high as compared to powdered coal, the metal particles are used more sparingly.

To catalyze and enhance the combustion rate of the powdered fuel mixture and produce a high temperature reaction, there is introduced a small amount of a metallic soap or mixture of such metallic soaps, for example 0.1 to 5% by weight of the powdered metal constituent of the composition. A suitable metallic soap consists of a stearate, palmitate, oleate, ricinoleate, etc., of aluminum, magnesium, beryllium, titanium, zirconium, tin or the like which exhibit auto oxidation catalytic properties. The metal particles of the fuel mixture are in the form of very finely divided particles, e.g., dust or flakes, with the metallic soap being preferably coated on or admixed with the flakes or particles of metal. As an example, aluminum metal flakes coated with aluminum stearate and admixed with coal dust forms an excellent fuel mixture.

Where the fuel is to be employed as a liquid slurry, the carbonaceous and metal particles in the form of flakes or dust and metallic soap catalyst are disposed in a relatively low boiling liquid hydrocarbon, for example kerosene, gasoline, diesel oil, etc., to provide a liquid combustible carrier for the powdered metal materials. Such a fuel is useful for operating jet engines, rockets and high temperature operated prime movers, and where the maximum B.t.u.'s are to be extracted from the burning fuel in a predetermined time.

For promoting the oxidation and increasing the speed of burning of the fuel, a peroxide may be introduced into the fuel mixture initially or during the burning of the same. For this purpose, 0.5 to 2% by weight of the fuel solids may comprise a peroxide.

As specific examples of the improved powdered metal fuel of this invention, a mixture of powdered coal, aluminum metal powder particles, preferably as powdered metal foil of a particle fineness of an average size of one micron is coated with aluminum stearate (0.1 to 5% by weight of the powdered metal mixture). In place of aluminum metal other low atomic weight metals such as beryllium and magnesium, or suitable mixtures thereof may be used. Small amounts up to 1% of other combustible metals, e.g., titanium metal powder, zirconium, zinc or tin may be present.

The metallic soap utilized as auto oxidation catalysts are preferably salts of metals in groups II, III and IV of the periodic table, representatives of which are the stearates or palmitates of aluminum, magnesium, titanium, zirconium and tin.

The powdered fuel mixture of coal dust and metal powder may be used in the form of a slurry, the same being admixed with liquid hydrocarbon and discharged into a combustion chamber. This slurry of oil and solid fuel particles may be sprayed into a combustion chamber as liquid ozone, and burned. In general, one to twenty-five parts of the solid fuel constituents to 100 parts by weight of the liquid hydrocarbon provides a suitable liquid fuel mixture. Liquid ozone in amount of 0.1 to 1% by weight of the total fuel mixture may be used. The burning of the fuel with ozone increases the exhaust velocity substantially over the use of air or oxygen alone. Higher or lower proportionate amounts of the liquid hydrocarbon and powdered fuel constituents may be employed as needed, to provide a fuel having the requisite consistency and burning characteristics desired. The powdered fuel may be mixed with the liquid hydrocarbon either before or during burning of the mixture.

The presence of the auto-oxidation catalyst in sufficient amount to catalyze the reaction forms an essential constituent of the powdered fuel. The metal particles which are combustible and tend to vaporize readily produce a high temperature reaction during the combustion. Powdered aluminum metal, for example, produces a flame having a temperature of 3500° C. or higher. The very high temperatures produced during the catalyzed reaction causes the powdered coal and metal particles to be rapidly disintegrated and vaporized. The combustion of the metal and coal particles thus proceed at a high rate, the temperature and explosive action being enhanced by the catalytic action of the metallic soap. The high temperatures produced combined with the violent disintegration and vaporization of the powdered fuel particles is believed to account for the unexpected high calorific values produced.

Heretofore, in the combustion of solid fuel particles, the maximum B.t.u.'s have not been obtained principally because the initial heating of the particles did not result in the production of temperatures high enough to disintegrate and vaporize the particles and permit air or oxygen to come in contact with all the particles and support its combustion to completion. In other words, under conventional combustion reactions using powdered metals there was always a certain minimum amount of the particles which were not burned to completion but passed off as smoke.

To illustrate one embodiment of the invention and how it may be used, there is shown in the drawing a diagrammatic illustration of a ram-jet and a turbo-jet engine which is fueled utilizing the fuel mixture of the present invention.

FIGURE 1 illustrates a ram jet having a starter rocket 10, combustion chamber 12, and exhaust nozzle 14. Fuel is supplied through a blower 16 which is connected to the coal dust supply through conduit 17, the coal dust being conveyed into the combustion chamber 12 through the conduit 18. A like blower 20 is arranged diagonally opposite the blower 16 and connected to a metal particle supply through the conduit 22 for supplying powdered metal to the combustion chamber through connecting conduit 24. Liquid fuel such as gasoline or the like when utilized is supplied through the nozzle members 27 and 28. Liquid ozone when used in supplied through the nozzle 30 centrally into the combustion chamber 12.

Figure 2:
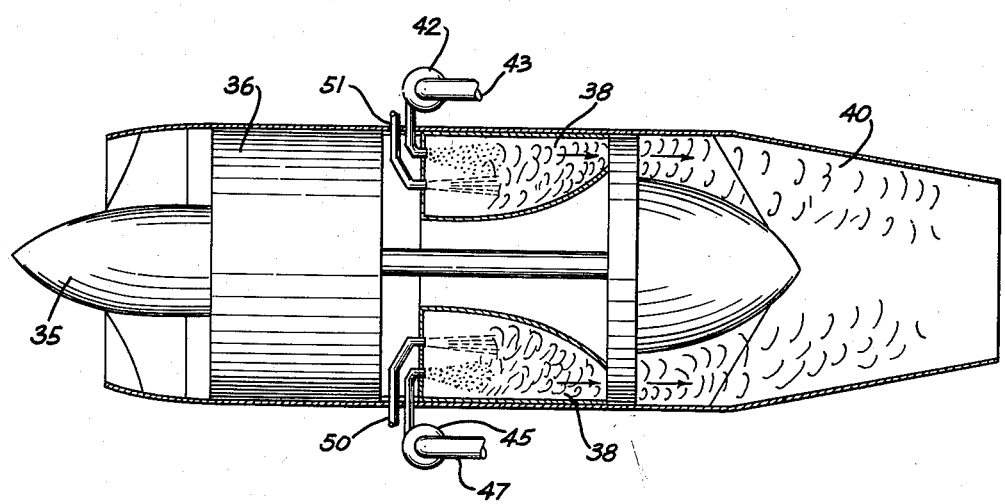

In FIGURE 2 the turbo-jet is provided with a starter engine 35, compressor 36, annularly disposed combustion chamber 38, and exhaust nozzle 40. Carbonaceous fuel such as coal dust is arranged to be supplied to the combustion chamber 38 by a blower 42 which is suitably connected to a source of supply of coal dust or the like through conduit 43.

Spaced diametrically opposite the blower 42 is a blower 45 which is connected through the source of powdered metal by conduit 47. Liquid fuel such as gasoline or the like hydrocarbon may be supplied through the conduits 50 and 51. Where liquid oxygen or ozone is to admixed with the powdered fuel in the combustion chamber 38, the same may be supplied through an additional nozzle not shown.

By utilizing a mixture of powdered metal, powdered coal or the like carbonaceous material and auto oxidation catalyst admixed with oxygen and burned in the combustion chamber, there is produced a high temperature and high velocity gases for operating the jet engine. The proportionate amount of fuel used is controlled so as to produce the most efficient operation of the engine.

The production of high temperatures during the combustion results in the maximum extraction of B.t.u.'s from the powdered coal and powdered metal material. To achieve this, however, it is requisite that the reaction be conducted so that the boiling point or vaporization point of the combustible material is lower than the flame-temperature, and that the heat of vaporization is lower than the energy required to initiate rapid surface oxidation or combustion.

The catalytic action of metallic soaps facilitates the burning of the finely divided metal particles and provides a high temperature reaction so that the maximum B.t.u.'s are obtained from the solid fuel particles. During combustion of the fuel the high temperatures produced rapidly transform the metal particles into gases at high temperatures.

Further, the use of pyrophoric metal powders, for example of aluminum, magnesium and beryllium together with coal dust, when used with a petroleum hydrocarbon carrier such as gasoline, kerosene, diesel oil or the like provides a fuel which is more sensitive to ignition and a fuel mixture wherein the flame produced by combustion proceeds more rapidly through the fuel, than when the solid fuel particles are employed alone. Moreover, the high temperature gases formed by the combustion of the mixture results in the production of high velocity exhaust gases.

In addition to the high rate of reaction and production of high temperatures and high gas velocities during combustion of finely divided metal particles and coal particles, it has been found that the addition of a small amount of a metallic soap such as aforementioned, for example aluminum, magnesium stearate or oleate or the like, will further accelerate this ignition and flame propagation during combustion of the fuel. This is probably due to the fact that the porous surface of the particles adsorb gas from the surrounding atmosphere and the metallic soap catalyzes the reaction.

To control the combustion and prevent explosion and to facilitate combustion, an excess of oxygen in the atmosphere is preferred and is introduced into the fuel either from a liquid ozone or mixture of air and peroxide, as heretofore explained. In this manner it is possible to produce the combustion at a lower ignition temperature and increase the rate of combustion and the adsorption of oxygen on the dust particles.

Metal particles such as aluminum, magnesium, beryllium and the like combustible material in the form of dust ignited in the presence of metallic soap catalytic agent burns at a high rate and temperature. The combustion rate promoting catalysts produce a powdered metal fuel which has a lower explosive limit or temperature, particularly in the presence of methane, oxygen or air, and results in the enhancement of the combustion of the fuel.

Control of the combustion and explosive properties of the powdered fuel mixture can be effected by utilizing different oxidizing agents and in various proportions. In this manner the incendiary action of the fuel may be controlled so as to either accelerate the combustion or burning up of the fuel particles or slow down their combustion as may be required in the use of the fuel. Thus, for making a fuel useful in internal combustion engines utilizing powdered carbon such as coal dust and metal powder, the combustion may be speeded up by the use of metallic soap and peroxide catalysts so that the mixture will burn and provide the high temperature reaction gases necessary to propel the piston in the predetermined time. In other instances where the fuel is required to burn more slowly, the use of negative catalysts such as those which do not accelerate the combustion but tend to decelerate the combustion are incorporated in the fuel.

In the case of metal particles such as finely divided aluminum flakes and similar metal particles, the ignition of the same is believed to have an electric or electronic origin as opposed to thermal ignition. The electrical discharges or ionization is believed to produce ozone and aluminum oxide ($Al_2O_5$) which reacts with the fine dust particles and initiates the decomposition of the same and flame propagation during the combustion of the fuel.

The electrical ignition depends largely upon the production of a sufficient concentration of charged particles and which results from electronic collisions due to ionization of the materials or the presence of ions or ionized particles in the explosive mixture. This electronic phase of the combustion is believed to play an important role in the increased efficiency of the fuel of this invention. The same is substantially true in the case of thermal ignition.

It is also considered to be immaterial whether the theory of predistillation of dust particles during ignition and combustion takes place or whether such a theory may be used to explain what happens to the fuel during combustion, or whether it involves some other theory for the production of the improved results. In the case of the predistillation theory of dust particle ignition, it is believed that all ignition and burning of such particles involves purely a gas or vapor explosion and that the energy of the ignition source provides heat to decompose the ultra fine particles thus causing the evoluion of the volatile matter. In this manner the volatilized gassy particles mix more readily with air and ignite and the combustion proceeds at a high rate and the heat produced in turn further heats and volatilizes other particles not yet volatilized.

One of the objections made to the above theory has been that the ignition temperature of such particles including coal, are lower than the ignition temperatures of the gases involved such as methane or the like hydrocarbon. However, there seems to be some support for the theory that during the initial heating and combustion of the dust there is not enough air present at the surface of the particle to continue to support the combustion, and consequently the temperature rises above the ignition point of the solid causing it to distill and eventually to ignite, thus initiating the combustion reaction.

In the preferred process of carrying out the combustion of the novel fuel of this invention, it is sought to have the concentration such as will provide sufficient heat to produce complete oxidation of the combustible coal and metal dust particles and thus release the maximum B.t.u.'s. The heat produced by complete oxidation of a portion of the finely divided solid particles in the available oxygen is enough to heat the rest of the dust in the mixture to bring the same to the ignition temperature. Theoretically, neglecting disassociation, the strongest explosion or greatest explosive force should be produced at a concentration corresponding to stoichiometric weight mixtures of the fuel ingredients. This can be computed if the chemical composition of the dust is known and provided complete combustion of the material is assumed to take place. In practice, however, somewhat richer dust mixtures are found to be the most explosive.

The adjustment of these mixtures to provide the greatest heat production is facilitated by the catalytic action of the metal powder constituent together with the auto-oxidation catalyst, and the fluid carrier which is preferably hydrocarbon as described. The initial temperature, pressure, oxygen content, humidity, specific heat and heat conductivity of the atmosphere all are factors which influence the dust explosion. The presence of oxygen is, of course, a most important factor.

As a source of ignition it is preferred to utilize a flame or hot surface. The presence of moisture which normally is a constituent of the mixture is advantageous since it reacts with the metal powder and similar materials at the reaction temperatures and results in the evolution of hydrogen gas. The production of hydrogen gas is effected particularly at elevated temperatures wherein decomposition and ionization of moisture is produced. This reduces the surface oxide coating which would otherwise tend to form on the particles and thus makes the fuel mixture highly sensitive to ignition and combustion.

Other pyrophoric metal dust-like particles may be present such as finely divided metal particles of iron manganese, copper uranium, nickel, zirconium and others, metal oxides, hydrides, carbides, nitrides and metal alloys which also oxidize rapidly on exposure to air that they tend to heat and ignite. While there is no apparent agreement regarding the exact mechanism of the pyrophoric ignition, it is believed that the process varies somewhat with the type of dust, its fineness and surface character.

The basic discovery in this invention is that by utilizing a combination of combustible metal particles with coal dust that the combustion can be achieved and controlled whereby the maximum liberation of gas and heat results from the reaction. The pyrophricity of these finely divided particles as hereinbefore mentioned, is believed to be related to a metastable internal equilibrium in the powders. Thus, one of the advantages of utilizing finely divided metal particles which are of such pyrophoric character, such as aluminum and/or magnesium or beryllium metal particles, is that with a sufficient dispersion of these extremely fine particles, the same will self-ignite by an electrostatic spark discharge within the cloud of dust.

Particularly satisfactory results have been secured with the use of particle sizes of the fuel composition of finer than 200-mesh. This fuel can be passed through an electrically heated cylindrical Alundum-cor furnace construction for ignition. The ignition temperatures for the powdered fuel will range from about 200° C. to more than 1000° C. These figures depend upon the dispersibility, fineness, uniformity of the solid fuel particles, the ignition source, the timing of ignition and the interpretation of what constitutes limiting flame propagation.

The igniting energy of these clouds of finely dispersed particles may vary with the fineness of the particles, the moisture content and also with the concentration in the cloud. For instance, undispersed layers of beryllium metal powder have been ignited by sparks of less than 1 microjoule (1 muj.) energy while other dusts take considerably stronger sparks. The igniting energy of dust clouds in air ranges from about 10 millijoules (10 mj.) to several joules.

The igniting source generally preferred is a high voltage induction spar. When these dusts are thus ignited the pressure is developed to more than 150 lb./in.$^2$ and rises to an average rate of pressure of about 5000 lb./in.$^2$ per second and the maximum rates to more than 10,000 lb./in.$^2$ per second. When using a high voltage continuous induction spark and dispersing the dust through a furnace at 850° C. a satisfactory result can be secured.

The minimum concentration of coal dust that will propagate large-scale explosions is approximately 50 mg./liter (0.05 oz./ft.$^3$) of air. Pressure is nearly 150 lb./in.$^2$ and flame velocities in excess of 6000 ft./sec. have been accomplished by the employment of the thermal properties of the metal particles and the catalysts, e.g., aluminum flakes and similar other dusts. As hereinbefore stated, in the presence of a liquid hydrocarbon fuel and oxygen, it is possible to achieve temperature and gas velocities of great magnitude and by adjusting the fineness of the materials involved, the amount of moisture present and the oxygen, the maximum energy can be released.

It will thus be seen that the present invention provides a novel fuel and method of producing high temperature combustion reactions, and wherein metal dust particles form a principal constituent.

Further, the invention provides a fuel wherein catalyzed metal dust-like particles are utilized to produce a high temperature fuel and wherein the maximum B.t.u. values are obtained.

It is understood that various changes and additions may be made in compounding the fuel of this invention and that the proportionate amount of ingredients may be varied over a relatively wide range, depending upon the particular use to which the fuel is to be put. Such changes and variations are contemplated to come within the spirit and scope of this invention, and which are more particularly set forth in the appended claims.

What is claimed is:

1. A fuel consisting essentially of a slurry of liquid hydrocarbon, finely divided coal particles, benzoyl peroxide as a catalyst, and finely divided metal particles which are combustible and selected from the group consisting of aluminum, magnesium, beryllium and mixtures thereof, and a second catalyst consisting of aluminum stearate, said coal and metal particles being of micron and submicron fineness, said finely divided coal particles and finely divided metal particles being admixed with said liquid hydrocarbon and liquid ozone and wherein the proportionate amount of solid fuel constituents of the composition approximate 25 parts by weight to 100 parts by weight of the liquid hydrocarbon and ozone mixture.

2. A fuel consisting essentially of a slurry of liquid hydrocarbon, liquid ozone, finely divided coal particles, benzoyl peroxide as a catalyst, and finely divided metal particles which are combustible and selected from the group consisting of aluminum, magnesium, beryllium and mixtures thereof, and a second catalyst consisting of aluminum stearate, said coal and metal particles being of micron and submicron fineness, said finely divided coal particles and finely divided metal particles being admixed with said liquid hydrocarbon and wherein the proportionate amount of solid fuel constituents of the composition approximate 25 parts by weight to 100 parts by weight of the liquid hydrocarbon, and said liquid ozone being incorporated in an amount of 0.1 to 1.0% by weight of the total fuel mixture.

References Cited in the file of this patent

UNITED STATES PATENTS

| | | |
|---|---|---|
| 1,506,323 | O'Neil | Aug. 26, 1924 |
| 2,416,639 | Pearsall | Feb. 25, 1947 |
| 2,530,493 | Van Loenen | Nov. 21, 1950 |
| 2,570,990 | Southern et al. | Oct. 9, 1951 |
| 2,751,284 | Hill et al. | June 19, 1956 |
| 2,771,739 | Malina et al. | Nov. 27, 1956 |

OTHER REFERENCES

Babcock et al.: Engineering and Mining Journal, vol. 155, No. 3, March 1954, pp. 84–86.